United States Patent [19]

Shea et al.

[11] Patent Number: 5,526,940
[45] Date of Patent: Jun. 18, 1996

[54] MULTILEVEL CONTAINER FOR TRANSPORTING AUTOMOBILES

[75] Inventors: Michael D. Shea, Miami; Bernard S. Sain, Jacksonville, both of Fla.

[73] Assignee: Sea Barge, Inc., Miami, Fla.

[21] Appl. No.: 246,338

[22] Filed: May 19, 1994

[51] Int. Cl.[6] ......................................................... A47F 7/00
[52] U.S. Cl. ............................... 211/13; 410/26; 414/786
[58] Field of Search ............................. 211/13, 175, 191; 410/24, 26, 27; 414/228, 229, 261

[56] References Cited

U.S. PATENT DOCUMENTS

| | | | |
|---|---|---|---|
| 3,192,880 | 7/1965 | Bergstrand | 410/26 X |
| 3,240,167 | 3/1966 | De Podesta et al. | 211/13 X |
| 4,801,229 | 1/1989 | Hanada et al. | 410/26 |
| 4,913,061 | 4/1990 | Youngblood | 410/26 X |
| 4,943,110 | 7/1990 | Pastva | 296/181 |
| 5,007,672 | 4/1991 | Koch | 296/100 |
| 5,044,689 | 9/1991 | Evers | 296/183 |
| 5,253,975 | 10/1993 | Takaguchi | 414/786 |
| 5,320,402 | 6/1994 | Evers | 296/183 |

FOREIGN PATENT DOCUMENTS

1220973  5/1960  France ......................... 410/26

Primary Examiner—Robert W. Gibson, Jr.
Attorney, Agent, or Firm—Foley & Lardner

[57] ABSTRACT

A container for transporting automobiles includes a plurality of vertically spaced decks, each having a pair of longitudinally extending vehicle ramps which define a transverse space in between. A continuous lashing dolly track extends longitudinally between one of an uppermost and intermediate pair of the vehicle ramps, and a lashing dolly is translatably suspended from the continuous lashing dolly track beneath the transverse space. A frame supports the decks and the continuous lashing dolly track. A weatherproof fabric cover may also be suspended between at least one pair of vertical members and a pair of longitudinal members of the frame to protect the automobiles from debris and small objects while providing a surface which will not harm a door upon contact.

24 Claims, 10 Drawing Sheets

MULTILEVEL CONTAINER FOR TRANSPORTING AUTOMOBILES

BACKGROUND OF THE INVENTION

The present invention relates generally to a container for transporting automobiles, and more particularly, to a multilevel container for transporting automobiles by sea and intermodal rail, which interfaces with I.S.O. shipping containers and state-of-the-art double-stack well cars.

Although there are currently several ways in which automobiles are transported overseas in conjunction with ocean carriers, the most common methods involve the use of standard 20 foot or 40 foot I.S.O. (International Standards Organization) dry containers. Before loading such containers onto a container vessel, one or two automobiles are driven into the container, positioned and secured, and packed aboard the vessel. Another method uses so-called Ro/Ro carriers (roll-on/roll-off) wherein cars are driven directly onto the vessel for transport, much like a ferry service. In fact, some Ro/Ro carriers include multilevel car decking or shelving onto which the cars are driven and secured during shipping.

In order to reduce labor costs, prevent damage, and maximize vessel space, it is desirable to ship automobiles on a Lo/Lo (lift-on/lift-off) container vessel that can accommodate multiple containers. Moreover, if the containers conform to I.S.O. standards, they can be stowed and interfaced with other I.S.O. units on the container vessel to maximize the number of automobiles carried at one time.

A disadvantage of the standard 20 foot or 40 foot I.S.O. dry containers is that they can accommodate only one or two automobiles, thus necessitating a large number of stevedoring and lift-on/lift-off operations in order to load and unload a container vessel.

SUMMARY OF THE INVENTION

Accordingly, it is an object of the present invention to provide a container for transporting automobiles which is able to stow and interface with standard I.S.O. containers while increasing the number of automobiles which can be carried and reducing the number of lift-on/lift-off operations required per automobile.

It is another object of the present invention to provide a container for transporting automobiles which facilitates secure lashing of multiple levels of automobiles by a stevedore in a safe and efficient manner.

It is yet another object of the present invention to provide a container for transporting automobiles which is able to be transported by road in an unassembled condition and quickly assembled in the field for loading, by intermodal rail in a fully loaded and assembled condition, and by Lo/Lo barge or ship in a fully loaded and assembled condition.

It is a further object of the present invention to provide a container for transporting automobiles which reduces damage to automobile door panels and other painted surfaces during loading and unloading.

Another object of the present invention is to provide a container for transporting automobiles which can be mated end-to-end with like units to allow movement of automobiles from one container to the next in order to increase efficiency of stevedoring activities or which can be mated side-to-side for conventional ramp loading activities.

In achieving these objects and others, there is provided according to one aspect of the present invention a container for transporting automobiles comprising a plurality of vertically spaced decks. Each deck includes a pair of longitudinally extending vehicle ramps which define a transverse space therebetween. A lashing dolly track extends longitudinally between one of an uppermost and intermediate pair of the vehicle ramps, and a lashing dolly is translatably suspended from the lashing dolly track beneath the transverse space. A frame supports the plurality of decks and lashing dolly track. Each vehicle ramp can further be provided with laterally opposed vertical side walls and an innermost wall of each pair of laterally opposed vertical side walls may have a plurality of vehicle tie down holes defined therein to facilitate lashing of automobiles. In accordance with this aspect of the invention, the lashing dolly track may include laterally spaced J-channel sections and the lashing dolly may include a platform which is supported by a support member rotatably affixed at a proximal end thereof to the platform and having a roller fixed at a distal end of the support member which is captively held in the lashing dolly track. The lashing dolly may further include a stowage member which is attachable between the platform and the lashing dolly track in a manner that the platform and support member fold against the lashing dolly track when the stowage member is attached. A transition plate may be hinged at one end to a terminal end of one of the vehicle ramps so as to fold against the horizontal portion of the vehicle ramp between the laterally opposed vertical side walls.

In another embodiment, a ladder is attached to the frame and a plurality of cross walks extend laterally between the respective pair of vehicle ramps in the vicinity of the ladders to facilitate boarding of the lashing dolly.

In accordance with another aspect of the present invention, there is provided a container for transporting automobiles comprising a plurality of vertically spaced decks, wherein each deck includes means for supporting at least one automobile. An open frame, including a plurality of interconnected longitudinal, transverse and vertical members, supports the plurality of decks. A weatherproof fabric cover is suspended between at least one pair of vertical members and a pair of longitudinal members to protect the automobiles from debris and small objects while providing a surface which will not harm a door upon contact. In one embodiment, the frame includes end-frame diagonal members, which extend between vertical and longitudinal members to provide rigidity to the frame while allowing free and unencumbered opening of a transported vehicle's door. In other embodiments, the fabric cover is a nylon webbing, the open frame is dimensioned in accordance with I.S.O. standards and provided with I.S.O. compatible connectors, and the vertical members are constructed in two pieces so that the container can be transported by road or rail prior to being spliced together in the field.

Other objects, features and advantages of the present invention will become apparent from the following detailed description of the preferred embodiments taken in conjunction with the drawings.

BRIEF DESCRIPTION OF THE DRAWINGS

The drawings are hereby expressly made a part of the specification.

Further details of the invention will be described with reference to the drawings, in which.

DETAILED DESCRIPTION OF THE PREFERRED EMBODIMENTS

Figure 1:
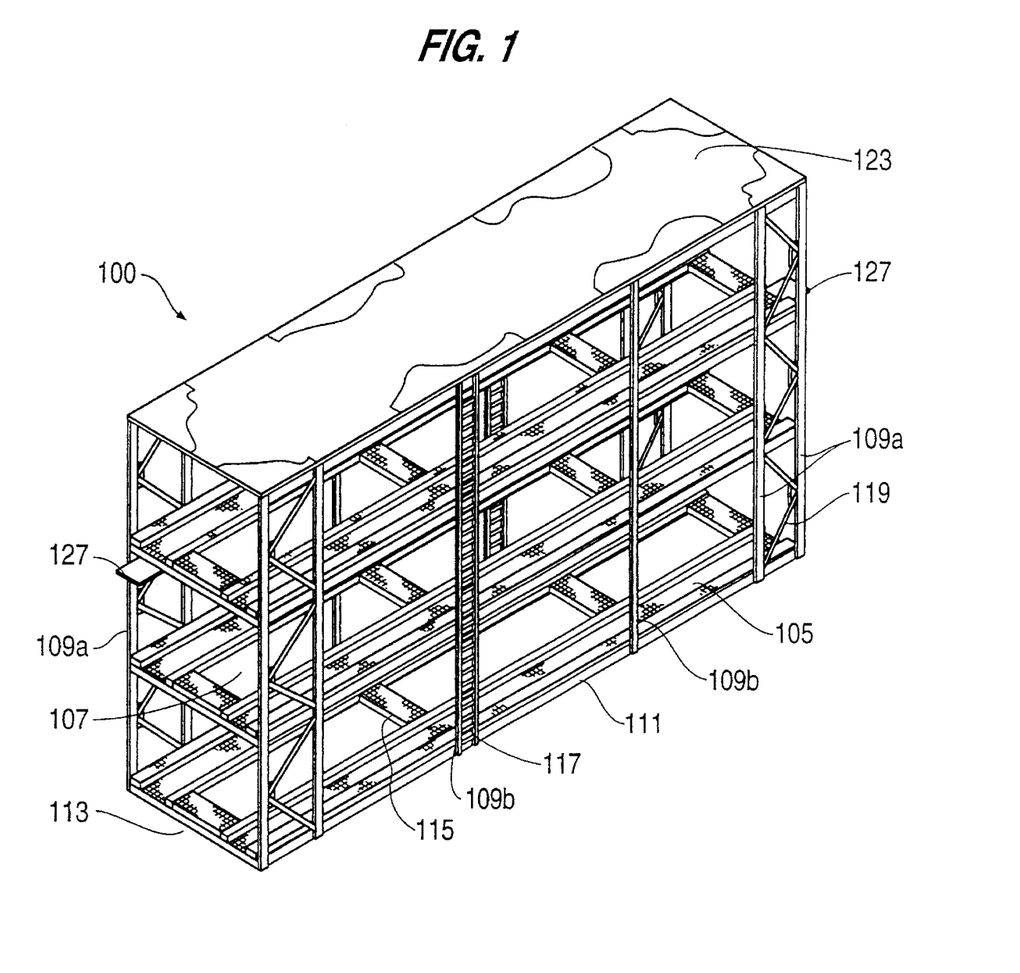
FIG. 1 is a perspective view showing a container for transporting automobiles according to the present invention.
Figure 2:
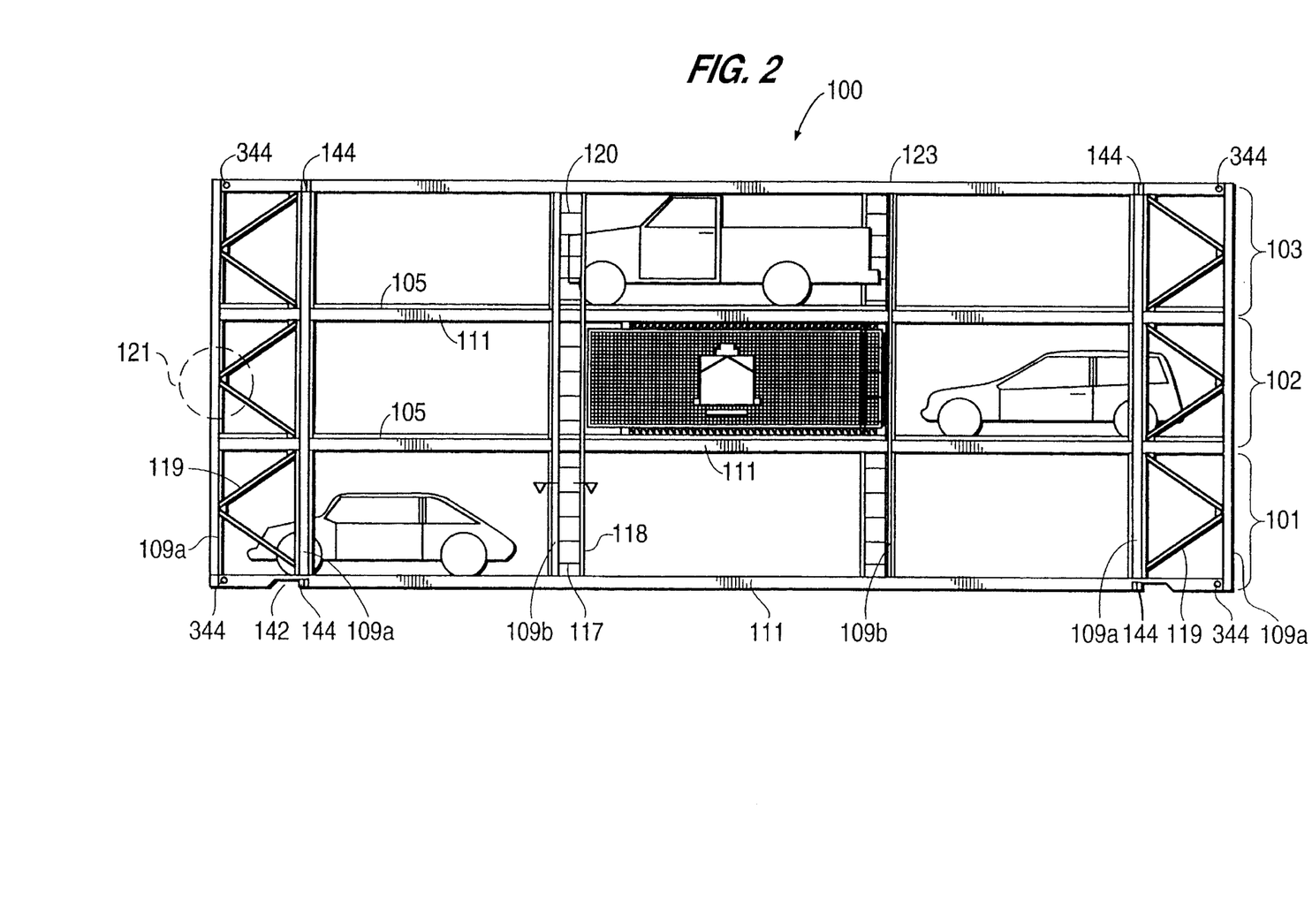
FIG. 2 is a side view of a container for transporting automobiles according to the present invention.

Referring now to FIGS. 1 and 2, a container 100 for transporting automobiles includes a plurality of vertically spaced decks 101, 102, 103, in which a plurality of automotive vehicles may be stored for transport. Although three decks are shown in the Figures, it will be appreciated that other numbers of decks may be provided within the scope of the present invention. Furthermore, the uppermost deck 103 may be provided with extra clearance height to accommodate minivans and other specialty vehicles. Each deck 101, 102, 103 includes a pair of vehicle ramps 105 which extend longitudinally through the container 100 for supporting multiple vehicles. Each pair of vehicle ramps 105 are laterally spaced to accommodate the tires of a broad range of automotive vehicles, and define therebetween a transverse space 107 which allows an operator or stevedore access to the bottom of the supported vehicles.

Figure 1A:
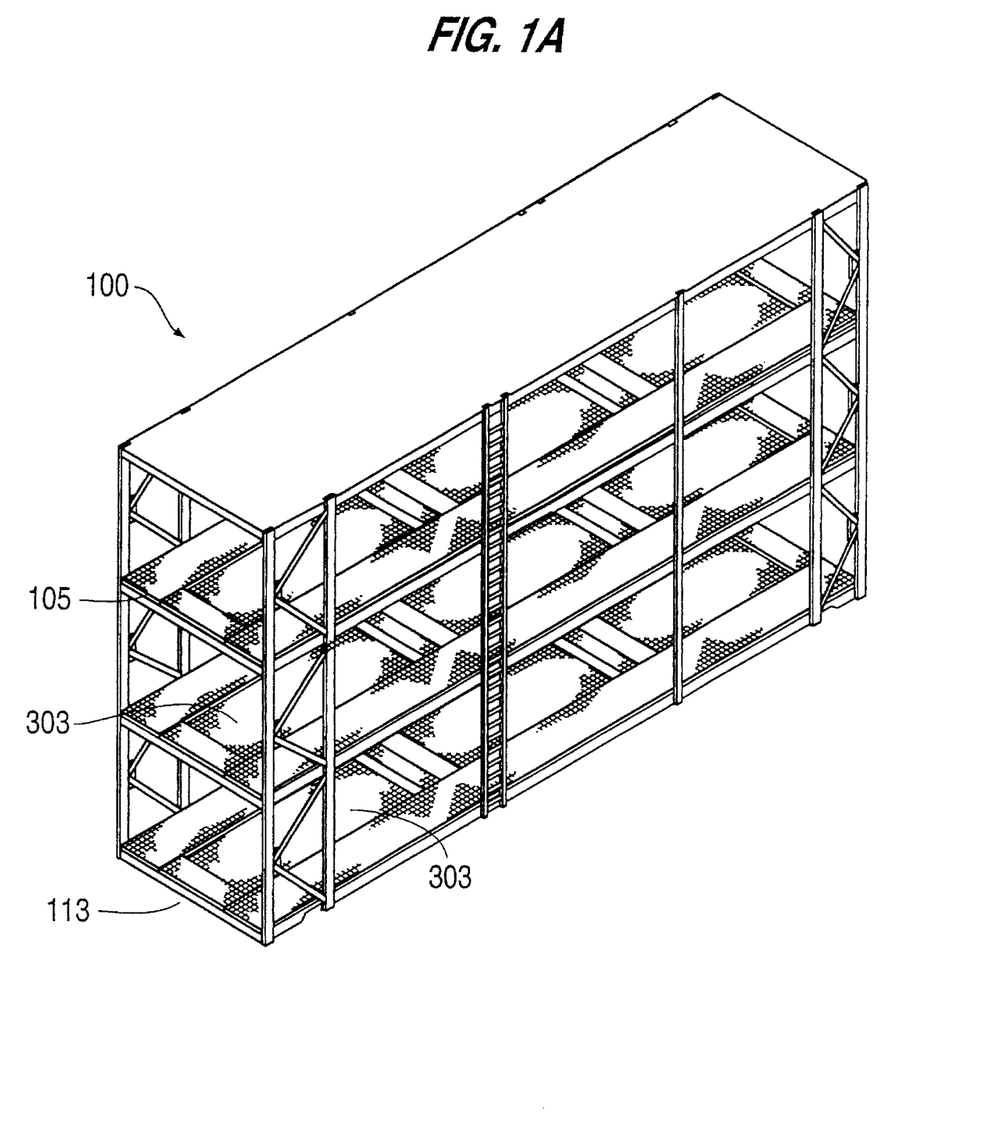
FIG. 1A is a perspective view of the container of FIG. 1 including expanded metal flooring.

FIG. 1A shows the container 100 of FIG. 1 with the added feature of expanded metal safety grating or floors 303 installed on each deck in the transverse space 107. The expanded metal gratings 303 installed between the vehicle ramps 105 provide additional safety for stevedoring personnel.

Figure 3:
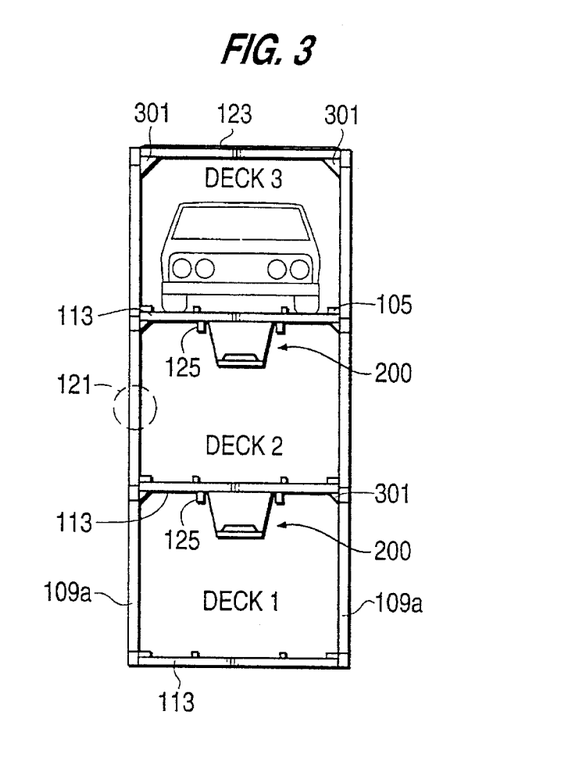
FIG. 3 is a front view of a container for transporting automobiles according to the present invention.

The vehicle ramps 105 are supported by a frame which includes endframe vertical members 109a, centrally located vertical members 109b, longitudinal members 111 and transverse members 113. The vehicle ramps 105 of each deck 101, 102 and 103 extend longitudinally across transverse members 113 and are thereby supported. As shown in FIGS. 1 through 3, vertical members 109a and 109b and longitudinal members 111 are interconnected to form exterior side portions of the frame, while transverse members 113 extend transversely between the exterior side portions formed by vertical members 109a and 109b and longitudinal members 111.

Crosswalks 115 extend transversely between vehicle ramps 105 and provide support for an operator or stevedore while moving between and lashing down the transported vehicles. Access to the crosswalks 115 is provided on upper decks, e.g., second and third decks 102 and 103, by means of a ladder 117 attached to an exterior portion of the frame and extending between respective longitudinal members 111. The ladders 117 are preferably incorporated into a centrally located vertical member 109b by providing a vertically opposed steel angle 118 opposite the vertical member 109b and extending therebetween one inch diameter steel tubing or one by one square tubing to serve as rungs 120. A 2×2×¼" steel angle is preferred for use as the second vertical member 118 of the ladder 117, and may be provided with throughholes along its length for reasons which will be described hereinafter.

The ladder 117 should preferably extend from the bottom of the container 100 to the roof 123 and provide access to each level of the container 100. The crosswalks 115 are preferably located in the vicinity of ladders 117 to further facilitate access to interior portions of the frame.

Near the ends of the container 100, diagonal pipe bracing 119 is provided which extends between pairs of endframe vertical support members 109a. Centrally located vertical support members 109b are typically (although not necessarily) spaced equidistant (e.g., 16 feet) from end portions of the frame and each other, while endframe vertical support members 109a are closely gathered near the ends (e.g., 4 feet apart). The diagonal pipe bracing 119 provides additional rigidity to the frame and allows the vertical members 109a at end frame portions to be closely spaced relative to the end of the frame. As seen in FIG. 2, the placement of vertical members 109a and 109b allows vehicle doors to be opened without obstruction, thereby reducing the incidence of damage to the vehicles' paint finish.

FIG. 3 shows corner gussets or braces 301 in the top corners of each of the end bays of the front end of the container 100. The gussets 301 provide additional rigidity and support to the frame. Gussets 301 may be located at similar positions at the opposite end of the container 100.

Figure 8A:
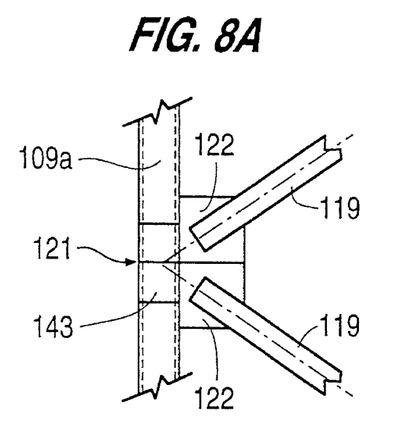
FIG. 8A is an enlarged fragmentary view of a field splice at an end frame diagonal.
Figure 8B:
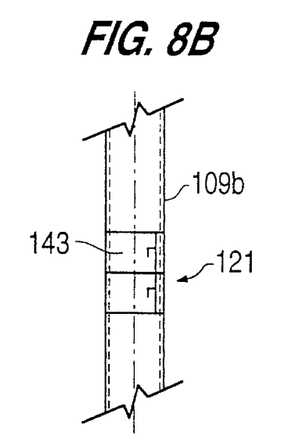
FIG. 8B is an enlarged fragmentary view showing a field splice at a central frame position.

As also shown in FIGS. 2, 8A and 8B, field splices 121 can be located approximately half-way up vertical members 109a, 109b. Because the container is 19 feet high, it cannot be transported over the road from point of manufacture to a terminal location in the fully assembled condition shown in FIGS. 1 through 3. By providing the container 100 with splices 121 in vertical members 109a, 109b, however, the invention allows for the container 100 to be fabricated in two sections and assembled on-site at the point of use. The splices 121 are located so as to provide for the least complicated area to be effected, i.e., vertical members 109a and 109b only, and not the decking or dolly structure which will be described hereinafter. In operation, upper and lower halves of the container 100 are mated together by lifting the top section into position with a crane, lining up the sleeve connections shown in FIGS. 8A and 8B, and seam welding the resulting joint. Once field welding is completed, the unit is fully capable of normal and intended operation.

Field splice details are essentially the same at end frame and central frame positions, as shown in FIGS. 8A and 8B, with the exception that gusset plates 122 used for attaching diagonal pipe braces 119 to vertical members 109a at endframe positions must also be cut and rewelded in the field. When vertical members 109a and 109b are steel tubing as shown in FIGS. 8A and 8B, chamfers (not shown) are expediently provided at spliced ends of vertical members 109a, 109b to facilitate structural welds. A steel backing plate 143 may be used at the joint between the vertical members.

Figure 6:
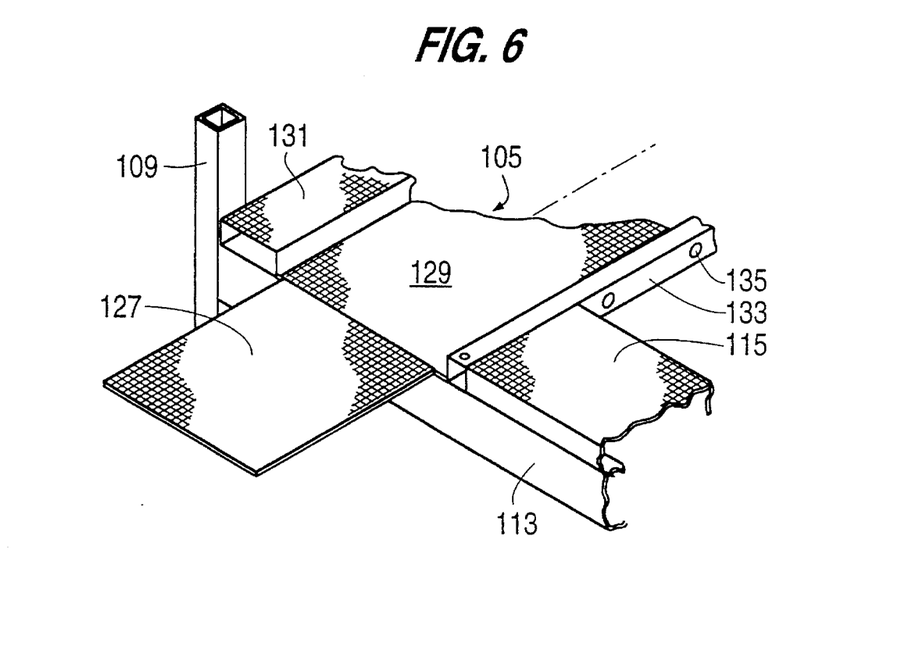
FIG. 6 is an exploded view of FIG. 1 showing the transition plate and details of the vehicle ramp.

Also shown in FIG. 1 is a transition plate 127, which is shown in detail in FIG. 6, connected to a vehicle ramp 105. Vehicle ramps 105, cross walks 115 and transition plates 127 are all provided with non-skid surfaces to ensure stevedore and vehicle traction. The transition plate 127 is preferably a square or rectangular plate member which is hinged at one end to a terminal end of a vehicle ramp 105. As can be seen from FIG. 6, the length of the side of the plate which is hinged corresponds approximately to the width of a horizontal portion of the vehicle ramp 105 (about 18") so that when the transition plate 127 is folded on top of the horizontal portion 129 of the vehicle ramp 105 it fits between vertical side walls 131 and 133 of the vertical ramp 105.

Figure 7:
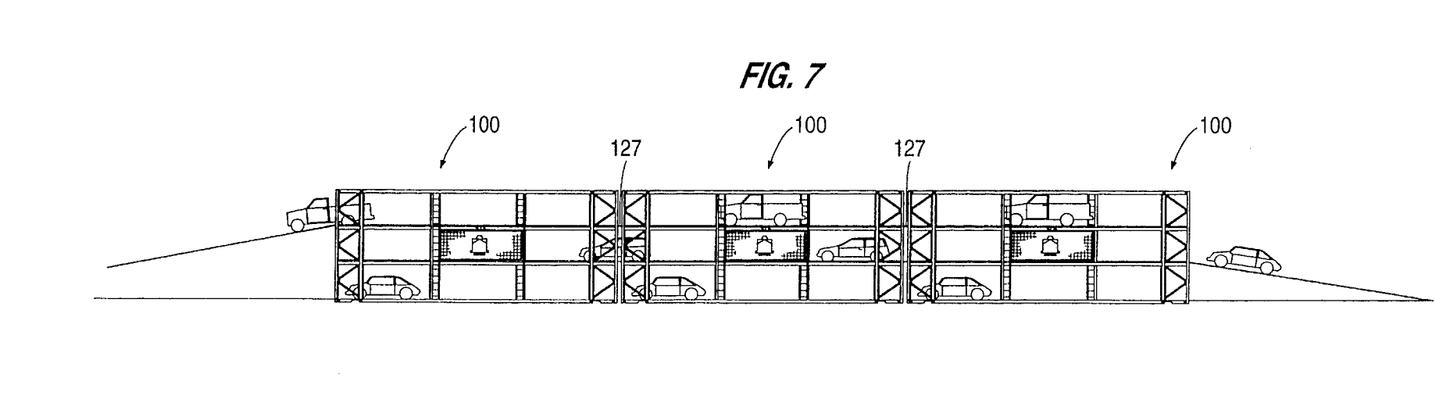
FIG. 7 is a side view showing a ganged assembly of containers.

When the transition plate 127 is unfolded from the vehicle ramp 105 so as to extend horizontally outward from the vehicle ramp 105, two or more containers 100 according to the present invention can be gangloaded as shown in FIG. 7. Because it is contemplated that each gangloaded container 100 will include transition plates 127, it is only necessary to provide each deck of respective containers with two diagonally opposed transition plates 127. During the mating procedure, a transition plate 127 from a first container unfolds into a vehicle ramp 105 of a second container while a transition plate 127 from the second container unfolds into the other vehicle ramp 105 of the first container. When the containers are positioned as shown in FIG. 7, multiple vehicle storage and stevedore activities can be performed.

The presence of the transition plates 127 ensures a smooth connection between the containers and allows the vehicle ramps 105 to be mated so that automobiles may be driven from one container to the next. When not in use, the transition plates 127 simply fold back onto the host container for storage. In addition to the hinged transition plate 127 shown and described, it is also contemplated that a transition plate may be provided which is able to slide into and out of a space provided in the vehicle ramp 105 (not shown). Either type of transition plate will allow adjustment for terminal and ground variations, thus facilitating connection between containers.

Figure 6A:
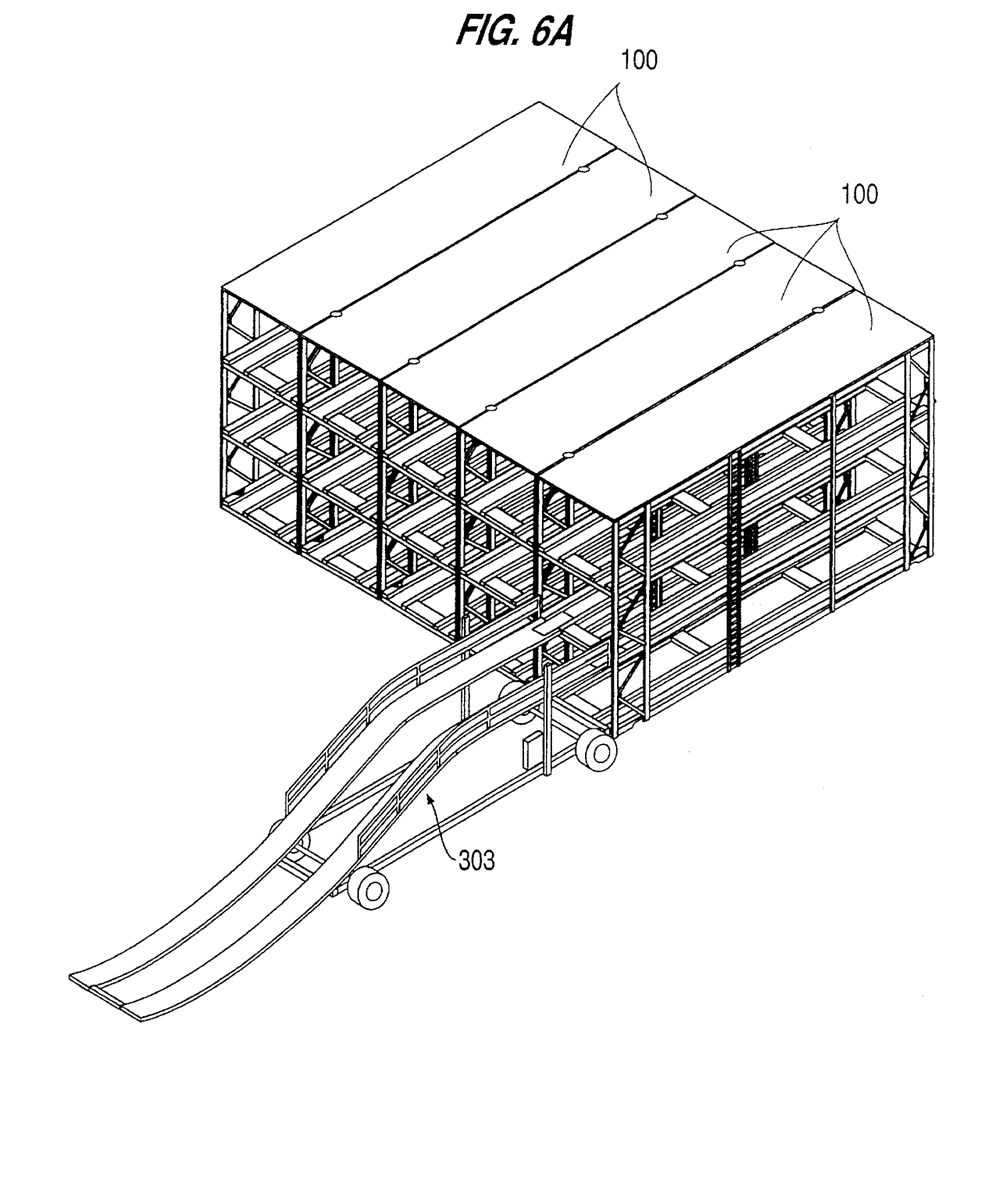
FIG. 6A shows a side-by-side gangloading operation.

FIG. 6A shows side-by-side loading of a plurality of containers 100 with a transversely movable ramp 303. The height of the ramp 303 is adjustable to each of the decks of the containers 100. The transversely movable ramp 303 is mounted on wheels so that it may be easily moved from one container 100 to another container 100.

Also shown in FIG. 6 are details of the vehicle ramp 105. In particular, each vehicle ramp 105 preferably includes a horizontal ramp portion 129 bounded lengthwise by a pair of vertical sidewalls 131 and 133. An innermost vertical sidewall 133 is shown provided with vehicle tie down holes 135 which are preferably positioned on 12 inch centers to facilitate attachment of chains and other lashing devices between the vehicles being transported and the innermost vertical sidewall 133. As mentioned previously in connection with FIG. 1, a transverse space 107 is defined between vehicle ramps 105, and thus the tie down holes 135 defined in the innermost vertical sidewall 133 are accessible to a stevedore through the transverse space 107.

Figure 4A:
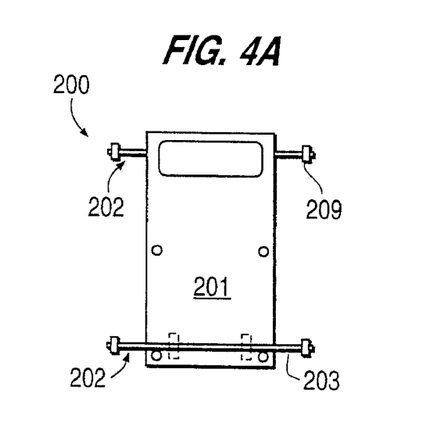
FIG. 4A is a top view of the lashing dolly according to the present invention.
Figure 4B:
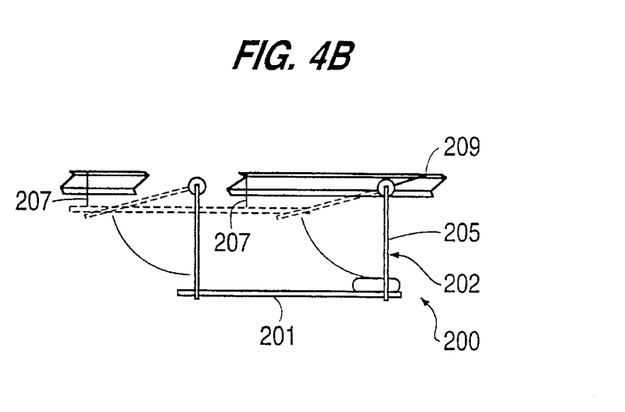
FIG. 4B is a side view of the lashing dolly showing its suspended and stowed positions.

In order to gain access to the transverse space located between vehicle ramps 105 and beneath the automobiles being transported, a stevedore is supported by a lashing dolly 200 (FIG. 3) which rides in a continuous lashing dolly track 125. Details of the lashing dolly are shown in FIGS. 4A and 4B, from which it is understood that each lashing dolly includes a platform 201, and at least one support member 202 which is rotatably affixed to the platform 201 and which includes a roller 209. The platform 201 may, for example, be made of a ¾" hardwood plywood and have a length of 3 feet and a width of 20 inches, which is suitable for supporting a man of average height and weight. The support member 202 is preferably U-shaped having a horizontal portion 203 which is rotatably affixed to a bottom surface of the platform 201, and vertical portions 205 which extend from the horizontal portion 203 to rollers 209. The support member 202 is conveniently formed from ⅝" steel bar while the rollers 209 are preferably 2½" diameter hard rubber rollers.

Because the horizontal portion 203 of the support member is rotatably affixed to a bottom surface of the platform 201, the entire lashing dolly 200 can be folded up against the lashing dolly track 125 through the use of stowage members 207 which may be, for example, bungee cords having a length which causes the lashing dolly 200 to fold when the bungee cord is attached at one end to the platform 201 of the lashing dolly 200 and at another end to the lashing dolly track 125. The folded position of the lashing dolly 200 is represented by broken lines in FIG. 4B.

Figure 5:
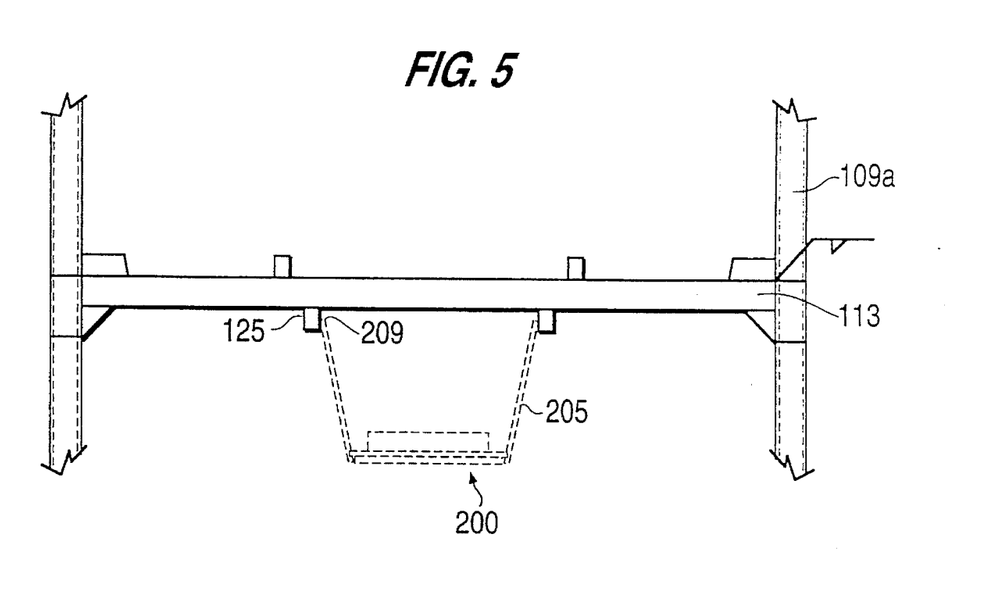
FIG. 5 is an fragmentary end-on view of the container for transporting automobiles according to the present invention, showing the continuous lashing dolly tracks.

Details of the lashing dolly track 125 are shown in FIG. 5, where it can be seen that the lashing dolly track 125 extends longitudinally between the vehicle ramps located at the bottom of the second and third decks 102, 103, respectively (See FIG. 3). The lashing dolly tracks 125 may conveniently and economically be formed from commercially available J-channel which is affixed longitudinally underneath transverse members 113 between vehicle ramps 105. As shown in FIG. 5, open portions of the J-channel may face each other so that vertical support members 205 of the lashing dolly 200 are disposed between the continuous lashing dolly tracks 125 and rollers 209 are captively held in the lashing dolly tracks 125. It is also within the scope of the invention, however, for web portions of the J-channel to face each other and for vertical support members 205 of the lashing dolly 200 to be disposed on outer sides of the lashing dolly tracks 125 with inwardly protruding portions holding the rollers 209 captively within the continuous lashing dolly tracks 125.

The combination of the continuous lashing dolly tracks 125 and the lashing dolly 200 allows for stevedoring personnel to comfortably and safely secure the vehicles to the tie down locations. The lashing dolly 200 is able to run the entire length of the container 100 under the uppermost and intermediate decks, e.g., second and third decks 102 and 103 shown in FIG. 3. By pulling himself along the lashing dolly tracks 125, the stevedore is able to lash the vehicles to respective decks of the container 100 for safe transport. The lashing can, for example, be accomplished through the use of chains and hooks with one end of the chain being attached to an axle and the other end being attached to tie-down holes 135 defined in the innermost vertical side walls 133 of the vehicle ramps 105. When not in use, the lashing dolly 200 may be stowed by simply folding the unit up to the continuous lashing dolly track 125 in the manner previously described. As can be seen in FIG. 4B, the vertical support members 205, transverse member 203, and lashing dolly 200 resemble a parallelogram when viewed from the side during stowage. In the example depicted in the Figs., two such lashing dollies 200 are supplied, one each underneath the second and third deck positions, 102 and 103, respectively.

Figure 9:
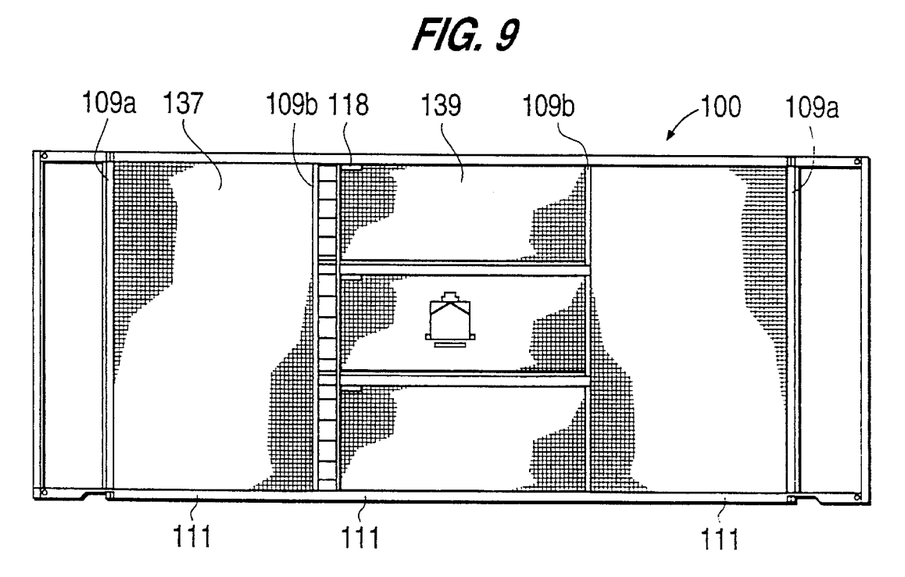
FIG. 9 is a side view of a container according to the present invention provided with a weatherproof fabric cover.

Referring now to FIG. 9, between intersections of vertical members 109a, 109b and longitudinal members 111 there is provided a nylon or like material in the form of large fabric panels 137 or small fabric panels 139 in order to provide both coverage and protection for the vehicles.

Figure 10:
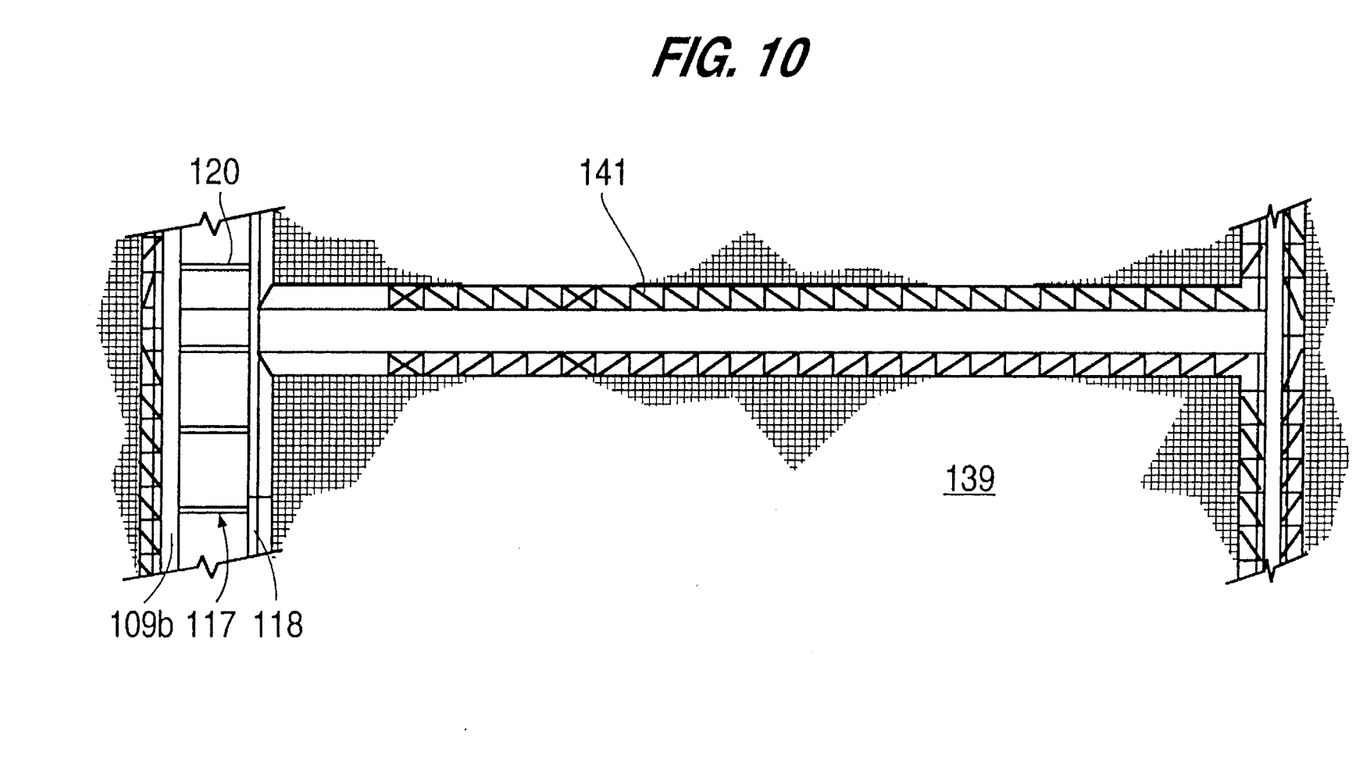
FIG. 10 is an enlarged fragmentary view of FIG. 9 showing details of the fabric cover.

In FIG. 10, details of the fabric covering 139 are shown. In particular, a weatherproof fabric cover 139 may be attached to longitudinal members 111, vertical members 109a and 109b, and even vertical ladder sections 118 of a ladder 117, with heavy cord lacing 141. As mentioned previously, end frame vertical members 109a are positioned so as to allow free and unencumbered opening of the doors of vehicles. The fabric panels 137 and 139 provide exterior walls which protect the automobiles from debris and small objects while providing a surface that will not harm the door in the event the stevedore makes contact during normal loading and unloading of the vehicle. Front portions of the container 100 may also be provided with fabric covers, when it is not desired that the containers be assembled in a ganged configuration as shown in FIG. 7.

To allow the stevedore access to interior portions of the container 100, fabric panels 139 in the vicinity of a ladder 117 are laced on three sides not bounded by the ladder 117. Additionally, a 2 foot section of the panel 139 in the vicinity of, and perpendicular to, the ladder 117 is not laced. These unlaced portions of the fabric panel 139 are instead lashed to through-holes in the ladder 117 with bungee cords or the like, thus allowing a stevedore to quickly unlash the panel 139 from the ladder 117 and to gain access to the interior of the container 100. Although it is preferred that the entire fabric panel 139 (and 137) have rolled seams, an extra-heavy rolled seam is particularly useful on the edge of a panel bordering a ladder, as are brass grommets for attaching the bungee cords to the panels. It is contemplated, for example, that five such bungee cords be used per deck to lash a fabric panel.

In operation, the container 100, according to the present invention, is manufactured in upper and lower halves as demarcated by the location of splices 121. These halves may be transported by road or rail to a container vessel loading site. It is at this site that the upper half of the container 100 is fitted to the lower half, and spliced together by means of welding. Once joined structurally, inclined ramps such as that shown in FIG. 7 are positioned at terminal ends of the vehicle ramps 105 and vehicles driven into respective decks of the container 100.

If more than one container is arranged in a longitudinal ganged assembly, the vehicles may be driven from one container to the next by virtue of transition plates which fold out from diagonally opposed corners of vehicle ramps 105 of a particular deck 101, 102 or 103. It will be appreciated that only two transition plates 127 are necessary for a given deck, because a transition plate from a first container will unfold into the second while a second transition plate from the second container will fold into the first when abutted. As shown in FIG. 6A, side-by-side gangloading is also possible. Prior to or after loading the vehicles onto the vehicle ramps 105, fabric panels 137 or 139 may be fastened as shown in FIG. 10 to respective cells of the container 100 defined by intersecting vertical members 109a, 109b and longitudinal members 111, or over multiple cells.

In order to lash down automobiles on intermediate and uppermost decks of the container 100, a stevedore must climb a ladder 117 to a desired deck, and exit onto a crosswalk 115 from which it is possible to board a lashing dolly 200. By pulling himself along the continuous lashing dolly track 125, the stevedore is able to lash the cars to respective lashdown points by operating in the transverse space defined between respective vehicle ramps 105. When all the cars on a given deck are properly lashed, the stevedore may dismount the lashing dolly 200 onto a crosswalk 115 and stow the lashing dolly 200 by means of bungee cords or the like to the lashing dolly track 125. The operation may be performed on any of the intermediate or uppermost levels of the container 100.

In a preferred embodiment, the container of the present invention is 19'-0" high, 8'-0" wide and 48'-0" long, which is exactly twice the height of a standard high-cube I.S.O. container (9'6"), thus allowing the container of the present invention to nest neatly into the space of two containers on a container vessel. With such dimensions, it is possible to transport up to 12 subcompact or 9 standard automobiles in a single container using three decks. It follows that only one lift-on and one lift-off procedure is required to load and unload 9 standard or 12 subcompact vehicles with a container according to the present invention wherein at least four such operations were previously required.

The assembled design height of 19'-0" of the container of the present invention allows the container to be accommodated safely on the new intermodal double-stack well cars used by the railroads. It is contemplated that one of the uses for the inventive container will be to load new vehicles onto the container at the vehicle assembly plant, then lift the loaded assembled units into the well-car for shipment to dockside.

In addition to satisfying dimensional requirements of I.S.O., it is also contemplated that the container of the present invention be provided with standard I.S.O. connectors, e.g., twist lock connectors 144 (FIG. 2), at 40' corner post locations. Eight-inch long access depressions 142 (FIG. 2) for lashing gear are expediently provided adjacent to the twist lock connectors on bottommost longitudinal members 111 of the container to allow slings from a crane to be securely positioned around the container. Standard twist lock connectors 344 may also be provided at 48' corner post positions.

Figure 11A:
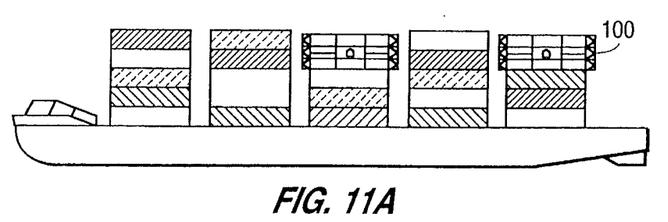
FIGS. 11A–11F show various stacking arrangements of the container.
Figure 11B:
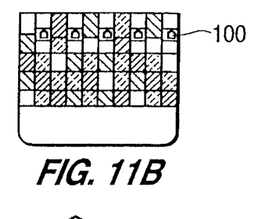
Figure 11C:
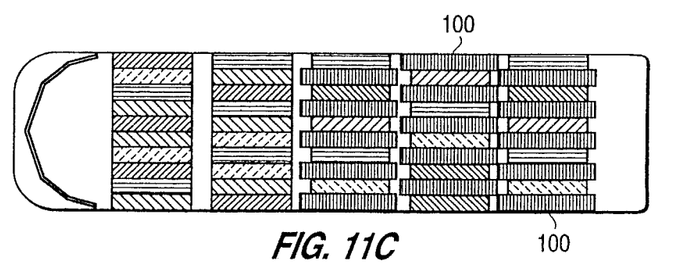
Figure 11D:
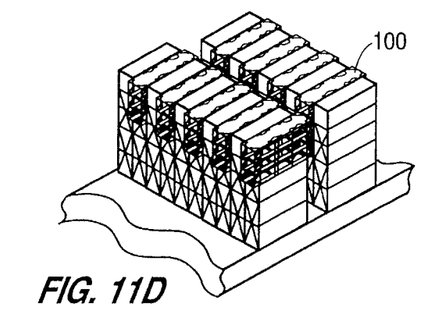
Figure 11E:
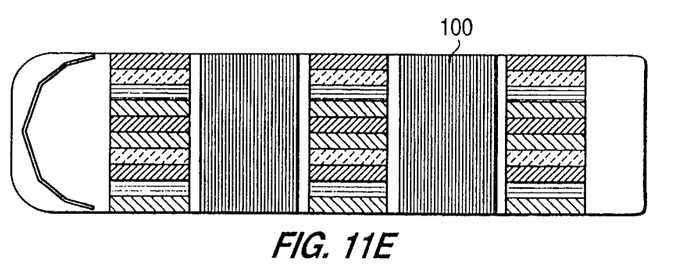
Figure 11F:
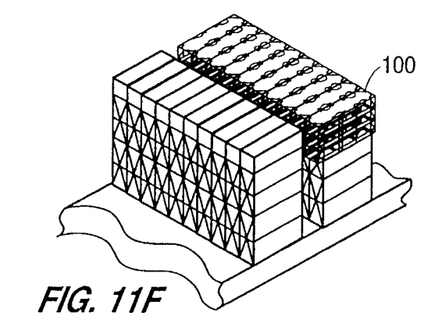

FIGS. 11A–11F show various stacking arrangements using the containers 100 of the present invention. FIG. 11A shows that the height of the container 100 is equal to the height of two standard high-cube I.S.O. containers. FIG. 11B is an end elevation showing the containers 100 alternately stacked at the top of container rows. FIG. 11C is a plan view showing the containers 100 at the top of alternate stacks of containers. FIG. 11D is a fragmentary perspective view of the plan view of FIG. 11C. FIG. 11E shows a stacking arrangement wherein the containers 100 comprise the upper most portions of an entire row of containers. FIG. 11F is a fragmentary perspective view of the plan view of FIG. 11E.

While the invention has been described with reference to particular embodiments thereof, those skilled in the art will appreciate that certain modifications and additions can be made without departing from the spirit and scope of the invention as recited in the appended claims, and equivalents thereof.

What is claimed is:

1. A container for transporting automobiles, comprising:
    a plurality of vertically spaced decks, each deck including
        a pair of longitudinally extending vehicle ramps which define therebetween a transverse space;

a lashing dolly track which extends longitudinally between a pair of vehicle ramps of one of an uppermost and intermediate deck;

a lashing dolly translatably suspended from said lashing dolly track beneath said transverse space; and a frame which supports said plurality of decks and lashing dolly track.

2. A container according to claim 1, wherein each of said vehicle ramps includes a pair of laterally opposed vertical side walls, an innermost wall of each pair of laterally opposed vertical side walls having a plurality of vehicle tie down holes defined therein.

3. A container according to claim 1, wherein said lashing dolly track includes laterally spaced J-channel sections.

4. A container according to claim 1, wherein said lashing dolly includes a platform, a support member rotatably affixed at a first end thereof to said platform, and a roller affixed to a second end of said support member and disposed in said lashing dolly track.

5. A container according to claim 4, wherein said support member includes a horizontal portion rotatably affixed to a bottom of said platform and a vertical portion which extends from said horizontal portion to a plurality of rollers captively held in said lashing dolly track.

6. A container according to claim 5, wherein said lashing dolly further includes a stowage member attachable between said platform and said lashing dolly track, a length of said stowage member being such that said support member and said platform fold against said lashing dolly track when said stowage member is attached.

7. A container according to claim 2, further comprising a transition plate which is hinged at one end to a terminal end of one of said vehicle ramps and which is dimensioned so as to fold against a horizontal portion of said vehicle ramp between said laterally opposed vertical side walls.

8. A container according to claim 1 further comprising at least one ladder attached to said frame, and a plurality of crosswalks which extend laterally between respective pairs of said vehicle ramps in the vicinity of said at least one ladder.

9. A container for transporting automobiles, comprising:

a plurality of vertically spaced decks, each deck including means for supporting a plurality of automobiles;

an open frame, including a plurality of interconnected longitudinal, transverse and vertical members, which support said plurality of decks, said vertical members being positioned such that doors of the plurality of automobiles can be opened without obstruction from said vertical members; and a weatherproof fabric cover which is suspended between at least one of a pair of vertical members and a pair of longitudinal members to protect the automobiles from debris and small objects while providing a surface which will not harm a door upon contact.

10. A container according to claim 9, wherein said frame further includes endframe diagonal means, extending between said vertical and longitudinal members, for providing rigidity to said frame while allowing free and unencumbered opening of a transported vehicle's door.

11. A container according to claim 9, wherein said fabric cover is a nylon webbing.

12. A container according to claim 9, wherein said open frame is dimensioned in accordance with I.S.O. standards and further includes I.S.O.-compatible twistlock connectors for stowage and interface with other I.S.O. containers.

13. A container according to claim 9, wherein said vertical members include upper and lower pieces and a field splice for joining said upper and lower pieces prior to transporting automobiles.

14. A container according to claim 13, wherein said upper and lower pieces are tubular and said field splice is a backing plate which fits within and is welded to said upper and lower tubular pieces.

15. A container according to claim 1, wherein said frame is about 19 feet in height, about 48 feet in length, and about 8 feet in width, and wherein three decks are supported thereby for transporting nine standard automobiles.

16. A container according to claim 9, wherein said frame is about 19 feet in height, about 48 feet in length, and about 8 feet in width, and wherein three decks are supported thereby for transporting nine standard automobiles.

17. A container for transporting automobiles, comprising:

a plurality of vertically spaced decks, each deck including a pair of longitudinally extending vehicle ramps which define therebetween a transverse space;

a lashing dolly track which extends longitudinally between a pair of vehicle ramps of one of an uppermost and intermediate deck;

a lashing dolly translatably suspended from said lashing dolly track beneath said transverse space;

an open frame, including a plurality of interconnected longitudinal, transverse and vertical members, which supports said plurality of decks and lashing dolly track, said frame further including endframe diagonal means, extending diagonally between endmost vertical and longitudinal members, for providing rigidity to said frame while allowing free and unencumbered opening of an automobile door;

at least one ladder, including a vertical ladder section which is parallel to a first vertical member of said frame and connected thereto by rungs; and a weatherproof fabric cover which is suspended between said vertical ladder section and a second vertical member, said fabric cover being attached with bungee cords to said vertical ladder section on one side.

18. A container according to claim 1, wherein said frame is about 19 feet in height, about 48 feet in length, and about 8 feet in width, and wherein three decks are supported thereby for transporting twelve subcompact automobiles.

19. A container according to claim 9, wherein said frame is about 19 feet in height, about 48 feet in length, and about 8 feet in width, and wherein three decks are supported thereby for transporting twelve subcompact automobiles.

20. A container according to claim 1, further comprising a floor disposed in the transverse space between the vehicle ramps.

21. A container according to claim 20, wherein the floor is an expanded metal grating.

22. A container according to claim 9, wherein each deck includes a floor.

23. A container according to claim 22, wherein the floor is an expanded metal grating.

24. A container according to claim 1, further comprising a second lashing dolly track which extends longitudinally between a pair of vehicle ramps of the other of the uppermost and intermediate decks.

* * * * *